US012651031B2

(12) United States Patent
Deshpande et al.

(10) Patent No.: US 12,651,031 B2
(45) Date of Patent: Jun. 9, 2026

(54) WEB3 ASSET CREATION USING GENERATIVE AI

(71) Applicant: SAP SE, Walldorf (DE)

(72) Inventors: Rohit Mukund Deshpande, Fremont, CA (US); Scott Young, Palo Alto, CA (US); Shardul Vikram, Sunnyvale, CA (US); Aria Niazi, Rocklin, CA (US); Narek Asadorian, Los Angeles, CA (US); Elias Andrew, Seattle, WA (US)

(73) Assignee: SAP SE, Walldorf (DE)

( * ) Notice: Subject to any disclaimer, the term of this patent is extended or adjusted under 35 U.S.C. 154(b) by 90 days.

(21) Appl. No.: 18/945,995

(22) Filed: Nov. 13, 2024

(65) Prior Publication Data

US 2026/0134051 A1     May 14, 2026

(51) Int. Cl.
*G06F 16/957*          (2019.01)
*G06F 16/955*          (2019.01)

(52) U.S. Cl.
CPC ........ *G06F 16/9574* (2019.01); *G06F 16/955* (2019.01)

(58) Field of Classification Search
CPC ........................... G06F 16/9574; G06F 16/955
See application file for complete search history.

(56) References Cited

U.S. PATENT DOCUMENTS

| | | | |
|---|---|---|---|
| 11,809,688 B1 * | 11/2023 | Parasnis .............. | G06F 3/04845 |
| 12,244,584 B1 * | 3/2025 | Balasubramanian ... | G06F 21/62 |
| 12,291,053 B2 * | 5/2025 | Wells ......................... | G06T 5/50 |
| 12,350,952 B2 * | 7/2025 | Wells ......................... | G06T 1/20 |
| 12,462,081 B2 * | 11/2025 | Agrawal .................. | G06F 30/27 |
| 2020/0064912 A1 * | 2/2020 | Melatti ................... | G06F 3/013 |
| 2020/0159871 A1 * | 5/2020 | Bowen ..................... | G06F 11/60 |
| 2020/0160612 A1 * | 5/2020 | Bowen ..................... | G06F 30/00 |
| 2022/0198801 A1 * | 6/2022 | Michael .................. | G06V 20/00 |
| 2024/0037812 A1 * | 2/2024 | Zalewski ................. | G06T 11/10 |
| 2024/0362518 A1 * | 10/2024 | Yerli ..................... | G06Q 10/101 |
| 2025/0086865 A1 * | 3/2025 | Menges .................. | G06T 11/10 |
| 2025/0095005 A1 * | 3/2025 | Royston ............. | G06Q 30/0201 |
| 2025/0095221 A1 * | 3/2025 | Jain ......................... | G06T 11/00 |
| 2025/0165522 A1 * | 5/2025 | Priya ..................... | G06F 16/532 |
| 2025/0191357 A1 * | 6/2025 | Pamuru ............. | G06Q 30/0643 |
| 2025/0208797 A1 * | 6/2025 | Otaka ................... | G06F 3/1204 |
| 2025/0322637 A1 * | 10/2025 | Smithweck .............. | G06T 7/62 |
| 2025/0348981 A1 * | 11/2025 | Deshpande .............. | G06T 3/40 |
| 2025/0363819 A1 * | 11/2025 | Hever ..................... | G06T 7/001 |
| 2025/0371764 A1 * | 12/2025 | MacQueen ............. | G06T 11/60 |

(Continued)

*Primary Examiner* — Muhammad Raza

(74) *Attorney, Agent, or Firm* — Buckley, Maschoff & Talwalkar LLC

(57) ABSTRACT

Systems and methods include reception of a first request to generate an image comprising a first prompt, determination of a first job sequence for the first request, storage of metadata comprising an identifier of the request, the first job sequence and a first status of a first job, generation of a first message comprising the identifier, the first prompt and the first job sequence, storage of the first message in a first processing queue, retrieval of the first message by a first service, prompting of an image generation model to generate a first image based on the prompt, storage of the first image in a blob store, storage of a URL associated with the image in the cache, update of the first status to a second status, and return of the URL.

14 Claims, 14 Drawing Sheets

(56) References Cited

U.S. PATENT DOCUMENTS

| | | | | |
|---|---|---|---|---|
| 2025/0384608 A1* | 12/2025 | Boyd | ...................... | G06T 13/40 |
| 2026/0024262 A1* | 1/2026 | Ilardi | ...................... | G06T 13/40 |
| 2026/0050893 A1* | 2/2026 | Patel | ...................... | G06Q 10/20 |

* cited by examiner

200

S205

RECEIVE REQUEST INCLUDING
IMAGE GENERATION/PROCESSING
PARAMETERS

S210

QUERY WORKFLOW COORDINATOR
TO DETERMINE JOB SEQUENCE

S215

GENERATE REQUEST ID

S220

STORE REQUEST METADATA AND
JOB SEQUENCE IN CACHE WITH
REQUEST ID

S225

STORE MESSAGE INCLUDING
PARAMETERS IN PROCESSING
QUEUE ASSOCIATED WITH NEXT JOB

B

S230

RETRIEVE MESSAGE FROM
PROCESSING QUEUE

A

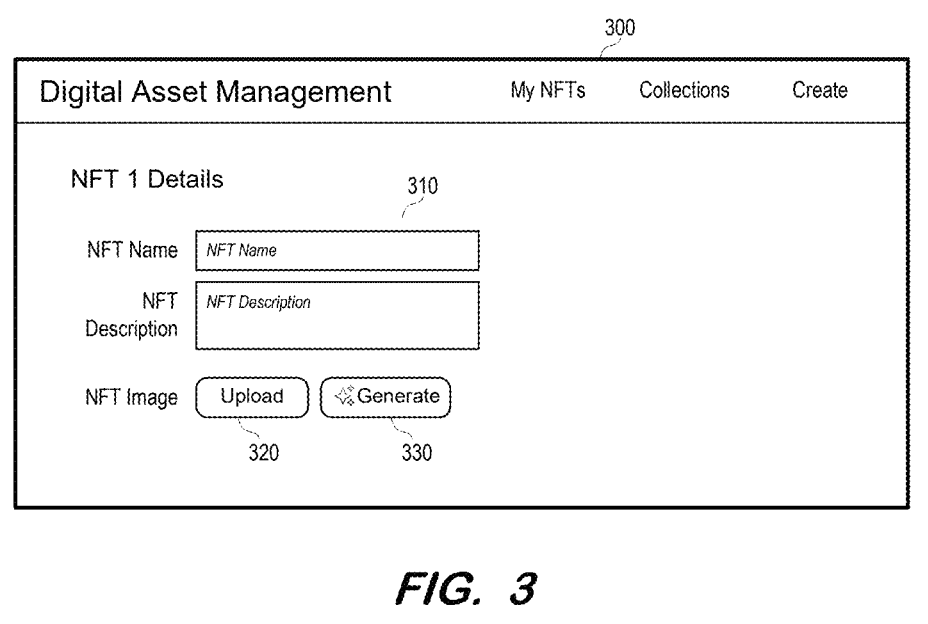

300

| Digital Asset Management | My NFTs | Collections | Create |
|---|---|---|---|

NFT 1 Details                    310

NFT Name | NFT Name

NFT Description | NFT Description

NFT Image | Upload | ✧ Generate 320            330

FIG. 3

WEB3 ASSET CREATION USING GENERATIVE AI

BACKGROUND

A non-fungible token (NFT) is a digital "Web3" asset that represents ownership of a digital or real-world item. NFTs are unique cryptographic tokens that cannot be replicated. NFTs exist on a blockchain and are similar to a certificate of authenticity that is issued by a creator of the NFT. The blockchain records the ownership of an NFT and allows the ownership to be transferred from one party to another party.

Widespread use of NFTs is limited by the technical expertise required to create, manage and interact with NFTs. Current generative artificial intelligence (AI) pipelines are often static and predefined, which limits their ability to adapt to varying user needs and dynamically changing conditions. This rigidity becomes a challenge when processing tasks that differ significantly in terms of complexity, user intent, and resource requirements. As a result, current generative AI pipelines may fail to deliver optimal results when handling diverse tasks such as image generation via complex multi-step workflows.

The lack of adaptability in such workflows can lead to resource bottlenecks, delays, and suboptimal outputs, particularly when handling high volumes of requests with varying requirements. Moreover, the asynchronous nature of Web3 transactions complicates the coordination of various steps within a workflow. It is therefore desirable to provide intuitive and efficient NFT creation in a Web3-compatible environment.

BRIEF DESCRIPTION OF THE DRAWINGS

FIG. 3 is a user interface for initiating creation of an NFT according to some embodiments.

DETAILED DESCRIPTION

The following description is provided to enable any person in the art to make and use the described embodiments. Various modifications, however, will be readily-apparent to those in the art.

Embodiments may provide coordinated execution of user-defined generative AI job sequences. A workflow coordinator evaluates an incoming request for NFT creation or editing and dynamically determines an appropriate job sequence. The job sequence is represented within a message that is sequentially forwarded to services capable of performing each job of the job sequence. Each service performs processing based on the message, updates the message based on its processing, determines a next service based on the job sequence, and forwards the message to the next service. Each service may be associated with a respective queue into which messages intended for the service are placed. Queueing of the messages may allow a service to forward a message to a next service and continue processing messages without waiting for a response from the next service.

Embodiments may enable usage of different job sequences for different types of incoming requests. This dynamic approach provides flexibility to accommodate a wide range of user requirements without predefined, static paths. Consequently, processing may be more efficient and tailored, thereby reducing delays, optimizing resource usage, and ensuring that the final output aligns with user intent, regardless of the complexity or variety of the requests.

Figure 1:
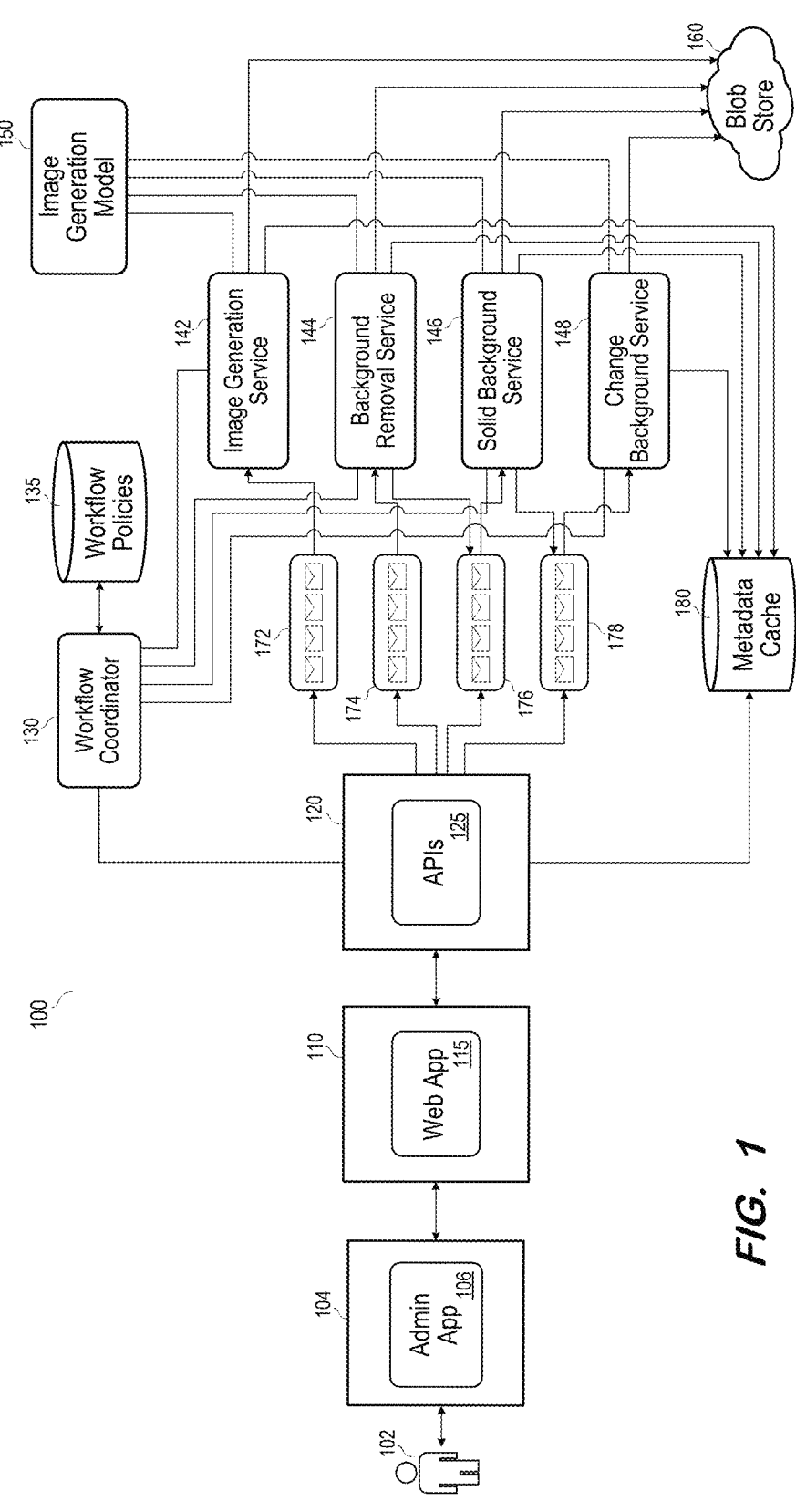
FIG. 1 is a block diagram of a system to create an NFT using an image generation model according to some embodiments.

FIG. 1 is a block diagram illustrating system 100 to create an NFT using an image generation model according to some embodiments. Each of the illustrated components may be implemented using any suitable combination of computing hardware and/or software that is or becomes known. In some embodiments, two or more components are implemented by a single computing device. Two or more components of system 100 may be co-located. One or more components may be implemented as a cloud service (e.g., Software-as-a-Service, Platform-as-a-Service). A cloud-based implementation of any components of system 100 may apportion computing resources elastically according to demand, need, price, and/or any other metric.

Each component may comprise, for example, comprise a single computer server, a virtual machine, or a cluster of computer servers such as a Kubernetes cluster. Kubernetes is an open-source system for automating deployment, scaling and management of containerized applications. Each component of system 100 may therefore be implemented by one or more servers (real and/or virtual) or containers. Each data storage component depicted herein may comprise one or more storage systems, each of which may be standalone or distributed, on-premise or cloud-based.

System 100 includes device 104 executing administrator application 106. Device 104 may include a Web browser compatible with Web2 protocols. In one example, application 106 executes within such a Web browser of device 104 to interact with Web application 115 of server 110. Web application 115 may provide management of NFT collections via Web2 protocols according to some embodiments. Such management will be described below with respect to FIG. 14.

During such management, administrator 102 may instruct Web application 115 to initiate generative AI-based creation of an NFT. In response, Web application 115 accesses functionality exposed by Application Programming Interface (API) server 120 via APIs 125. Web application 115 communicates with API server 120 via an API query language such as GraphQL and leverages secure tokens (e.g., Web tokens) for user authentication, user authorization, and multi-tenancy.

API server 120 may comprise a Go server and APIs 125 may comprise REST-based APIs. Upon receiving a request from Web application 115, API server 120 generates and returns a unique session_id for the request. API server 120 also requests a workflow from workflow coordinator 130 based on the request. Workflow coordinator 130 determines a workflow based on a type of the request and on workflow policies 135. Workflow policies 135 defines workflows for various request types, where a workflow defines a sequence of jobs which should be executed for a given request type. Workflow policies 135 may be customizable to change a job sequence to be executed for a request type, to specify a job sequence for a new request type, and to incorporate new jobs into workflows for existing or new request types. Workflow policies 135 support consistent workflow execution across different services and consistency in request handling, particularly if new services are added.

Workflow policies 135 may also comprise workflow metadata used to monitor and optimize system 100. This metadata may comprise but is not limited to the number of times a given workflow was executed and image generation models which were used in the workflow.

Each of services 142, 144, 146 and 148 is capable of executing a respective job. According to the illustrated example, the services include image generation service 142, background removal service 144, solid background service 146 and change background service 148. Embodiments are not limited to these services. Image generation service 142 generates images based on a text prompt and possibly other parameters. Image generation service 142 calls image generation model 150, which may comprise any trained text-to-image generation model that is or becomes known. Current examples of image generation model 150 include Stable Diffusion and FLUX.1. Image generation model 150 may be publicly available or a proprietary model of a provider of system 100.

Background removal service 144 removes the background from images. Background removal service 144 may employ a graphics library and/or may call image generation model 150 to remove the background in some embodiments. Solid background service 146 may add a solid-colored background to an image according to some embodiments, while change background service 148 may operate to change the background of an existing image. Other services which may be provided include but are not limited to a text overlay service for adding text or image overlays to an image. In one example, workflow policies 135 store a change_background workflow corresponding to change_background requests received by server 120. The change_background workflow may specify a sequence of jobs to be executed for the request type, such as: remove_background_job, add_solid_background_job, and change_background_job. Each of these jobs may be respectively executed by background removal service 144, solid background service 146, and change background service 148.

Each of services 142, 144, 146 and 148 stores an output image to Binary Large OBject (i.e., blob) store 160. Blob store 160 may comprise cloud storage that stores large amounts of unstructured data, such as binary or text data, in non-hierarchical storage areas such as data lakes. Blob store 160 returns a Uniform Resource Locator (URL) which is usable to access the stored image. Each stored image may be associated with metadata (e.g., a timestamp) to manage the images (e.g., by deleting images older than one year). Each of processing queues 172, 174, 176 and 178 corresponds to a respective one or services 142, 144, 146 and 148, such that messages placed in a given processing queue are processed asynchronously by the service corresponding to the queue. For multi-service workflows, a first service may store an image in blob store 160, receive a URL therefrom, add the URL to a message representing the request, and place the message in a processing queue of a next service in the workflow so that the next service can use the URL to retrieve the image from blob store 160 for further processing.

As mentioned above, upon receiving a request for image generation or image processing from server 110, API server 120 queries workflow coordinator 130 for a workflow corresponding to the request. API server 120 then constructs a message including any data or parameters passed with the request, the session_id of the request, and the job sequence of the workflow. API server 120 then writes the message to the queue 172, 174, 176 or 178 of the service which corresponds to the first job of the workflow.

API server 120 also stores the session_id, an identifier of the current (i.e., first) service, the status of the current service and other metadata associated with the request in metadata cache 180, such as a REDIS cache. As will be described below, services 142, 144, 146 and 148 may update this data as services are executed for the request. Using the the session_id, Web application 115 may poll server 120 for the data of cache 180 associated with the session_id to manage and track the processing of the request.

Figure 2A:
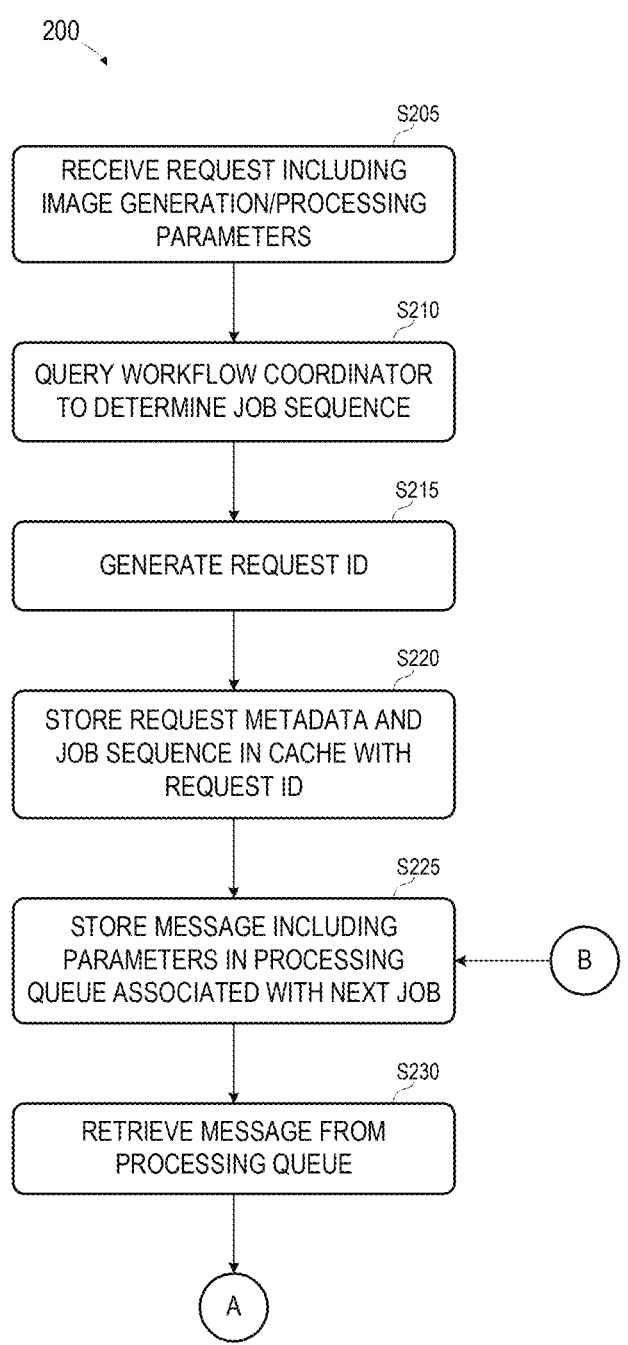
FIGS. 2A and 2B are a flow diagram of a process to create an NFT using an image generation model according to some embodiments.
Figure 2B:
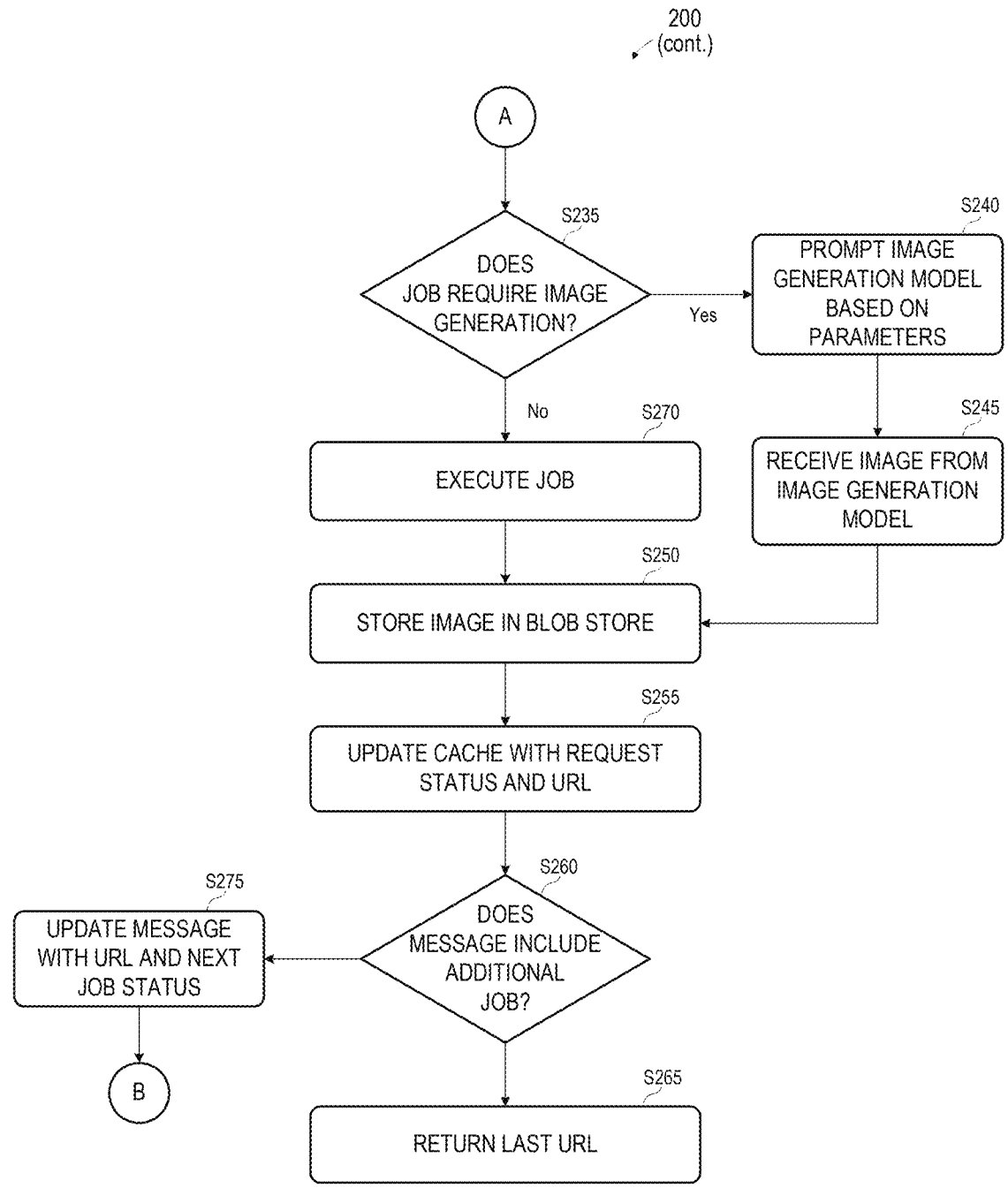

FIGS. 2A and 2B comprise a flow diagram of process 200 to create an NFT using an image generation model according to some embodiments. Process 200 and the other processes described herein may be performed using any suitable combination of hardware and software. Software program code embodying these processes may be stored by any non-transitory tangible medium, including a fixed disk, a volatile or non-volatile random-access memory, a DVD, a Flash drive, or a magnetic tape, and executed by any one or more processing units, including but not limited to a microprocessor, a microprocessor core, and a microprocessor thread. Embodiments are not limited to the examples described below.

Initially, at S205, a request including image generation or image processing parameters is received. The request may comprise a request to generate a new image or to edit an existing image. The request may be received, for example, by a Web2 server such as server 110. According to some examples, administrator 102 operates a Web browser of device 104 to access a URL associated with Web application 115 executed by server 110 and to subsequently interact with Web application 115 to request creation of an NFT. Assuming administrator 102 is authenticated to Web application 115 and authorized to create an NFT, a user interface for creating an NFT is presented.

FIG. 3 illustrates interface 300 of a Web2 application to receive metadata and data describing an NFT according to some embodiments. Input area 310 of interface 300 allows an administrator to provide metadata of an NFT to be created, including a name and a description. Upload control 320 may be selected to upload an image of the NFT from a storage location. Generate control 330, on the other hand, may be selected to initiate generative AI-based generation of an NFT image.

Figure 4:
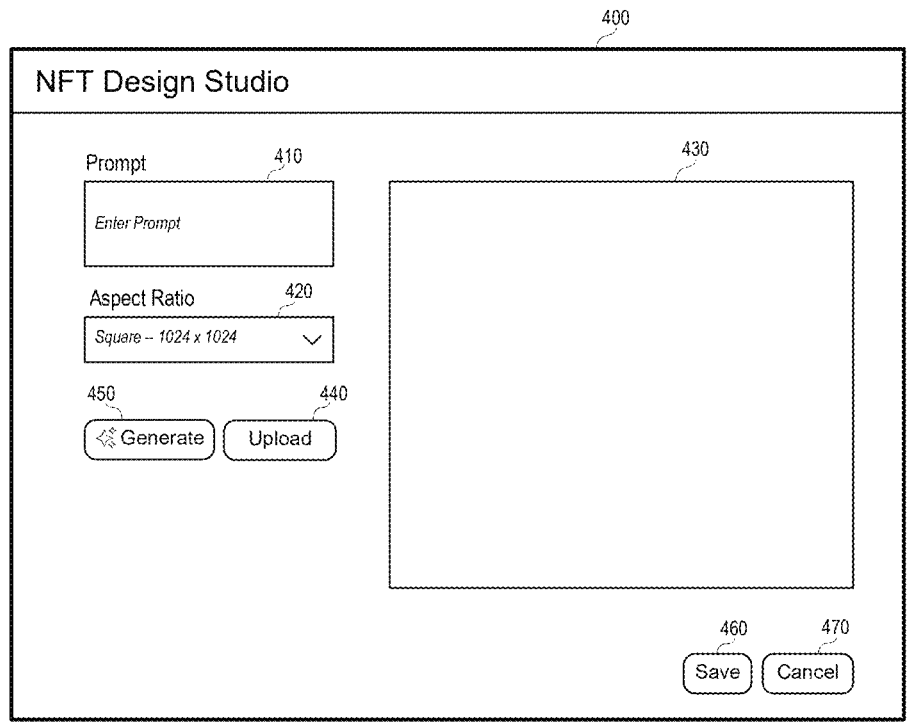
FIG. 4 is a user interface for creating an NFT according to some embodiments.

It will be assumed that control 330 is selected and user interface 400 of FIG. 4 is presented in response. User interface 400 includes prompt input area 410 for inputting text describing a desired image. Drop-down menu 420 specifies a preferred aspect ratio of the image to be generated, and area 430 is reserved for displaying generated and/or processed images. Selection of Upload control 440 allows retrieval of an image from a storage location to be displayed in area 430. On the other hand, Generate control 450, may be selected to initiate generative AI-based generation of an NFT image.

In particular, selection of Generate control 450 causes Web application 115 to call an API of APIs 125 to request image generation. The request includes a text prompt input into area 410 and, if present, an aspect ratio selected in drop-down menu 420. The request may also pass identifiers of a tenant with which administrator 102 is associated and of a consumer (i.e., Web application 115). The request is received at S205.

At S210, a workflow coordinator is queried to determine a job sequence corresponding to the request. In the present example, workflow coordinator 130 checks workflow policies 135 for a corresponding workflow and determines that the workflow corresponding to an "image generation" request consists only of a generate_image job.

API server 120 generates a unique identifier of the request (i.e., session_id) at S215 and stores the identifier in association with the job sequence and other request metadata in a cache such as cache 180 at S220. The session_id may function as a hash key to the stored metadata. The request metadata may include a status of the request, initially set to "in-progress", and the processing queue of the next job to be processed (i.e., image_generation). According to some embodiments, the stored metadata includes a start timestamp indicating when the request was received, a consumer_id of the requesting application (e.g., Web app 115) and a tenant_id. Metadata fields associated with the session_id are also available for storing a result URL pointing to a location of blob store 160 and an end timestamp indicating when processing was completed.

Next, at S225, a message including the parameters is generated and is stored in the processing queue associated with the upcoming job. The message includes the session_id, consumer_id and the tenant_id. The message may also specify the name of the final service to be executed in response to the request, i.e., the last job of the current workflow.

In the case of a workflow consisting of multiple jobs, the message is updated by each service used to execute a job prior to passing the message to the queue of a next service to execute a next job. In order to provide each service with the identity of the processing queue to be used for the next job, the message includes a sequence of queues corresponding to the job sequence of the current workflow. Since the message is processed by each service of the job sequence, the message includes all the parameters needed to execute each job of the job sequence. For example, the message may include a text prompt for an image generation service, an aspect ratio for an image generation service, a link to an image for background removal or text overlay services, text for a text overlay service, etc.

The message may also identify the queue of a service that was executed prior to execution of the current service and any data produced by the prior service. For example, if the previous service generated an image, the message may include a URL of the generated image. The message may also include an identifier of a next queue (or service) to which the message will be forwarded after the currently-executing service is complete. In some embodiments, the message includes an array that records a log of all the services that have been executed for this request, including execution outcomes and outputs.

According to the present example, it will be assumed that administrator 102 has input the prompt "earbuds and earbud case on a desk" into prompt input area 410 of interface 400 and selected Generate control 450. In response, a request is received by API server 120 at S205 and workflow coordinator 130 is queried at S210 to determine a job sequence corresponding to the request. The determined job sequence consists only of an image generation job. Request metadata and the job sequence are stored in cache 180 at S220 in association with a session_id and, at S225, a message including the prompt is created and stored in processing queue 172, which corresponds to image generation service 142.

Image generation service 142 retrieves the message from the queue at S230, for example in a first-in, first-out manner. In this regard, each of services 142, 144, 146 and 148 executes S230-S275 of process 200 with respect to messages placed in their respective processing queues. Continuing the present example, flow proceeds from S235 to S240 because the current job requires image generation.

An image generation model is prompted to generate an image based on the received parameters, i.e., the prompt. As is known in the art, the prompt may comprise a user prompt which is transmitted to an image generation model at S240 along with a system prompt. The system prompt includes the generic query (e.g., "Generate an image for an NFT.") and the context (e.g., "You are a graphic designer with an expertise in marketing.") that the model uses to generate an image, while the user prompt provides information regarding the specific image (e.g., "earbuds and earbud case on a desk") for which the model is being prompted. The generated image is received at S245.

Figure 5:
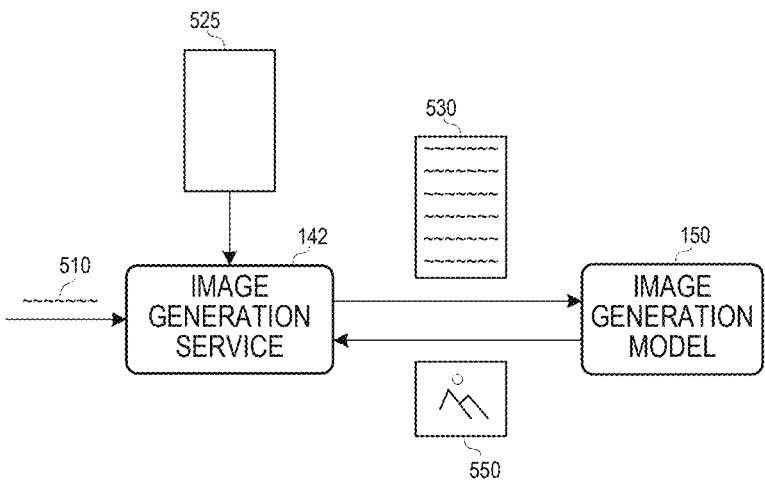
FIG. 5 illustrates prompting of an image generation model according to some embodiments.

According to some embodiments, the system prompt may comprise a prompt template which is populated with the prompt which was input to area 410. FIG. 5 illustrates prompting of generative AI model according to some embodiments. As described above, image generation service 142 receives a message from queue 172 including prompt text 510. Image generation service 142 generates prompt 530 based on prompt template 525 (i.e., a system prompt) and prompt text 510 (i.e., a user prompt). Service 142 submits prompt 530 to image generation model 150 using known protocols and receives image 550 in return.

At S250, the image is stored in a blob store and a corresponding URL is received from the blob store. The cache is updated at S255 to associate the request identifier with a new request status (e.g., "completed") and the URL. Next, at S260, it is determined whether the job sequence of the message includes one or more jobs subsequent to the just-completed job. If not, flow proceeds to S265 to return the last blob store URL to the requestor (e.g., Web app 115). The requestor may use the URL to retrieve the corresponding image from the blob store for display to the administrator.

Figure 6:
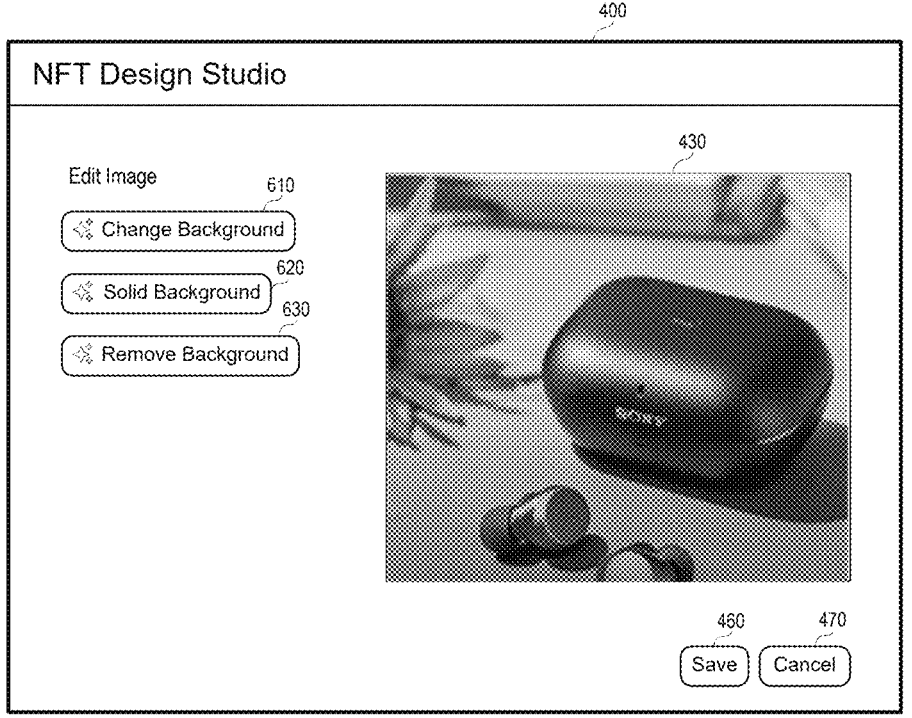
FIG. 6 is a user interface for creating an NFT according to some embodiments.

FIG. 6 shows interface 400 presenting a generated image in area 430 according to some embodiments. The presented image may be saved to a desired directory using Save control 460 or the image generation may be cancelled without saving the image using Cancel control 470. Interface 400 also includes controls 610, 620 and 630 for initiating requests for services to edit the image. As will be described below, some of the requests require chained execution of two or more services.

Initially, it will be assumed that the administrator selects control 630 to initiate a request to remove the background of the displayed image. The request is received at S205, including parameters such as the blob store URL at which the image is stored. The workflow coordinator is queried at S210 as described above to determine a job sequence corresponding to the request. According to the present example, the job sequence consists of one job, a remove-_background job.

A unique identifier of the received request is generated at S215 and is stored at S220 in association with the job sequence and other request metadata such as the URL, a status (e.g., "in-progress") and the processing queue of the next job to be processed (i.e., background_removal). Next, at S225, a message including the parameters is generated and is stored in the processing queue associated with the upcoming job.

According to the present example, background removal service 144 retrieves the message from the queue at S230. Since background removal does not require image generation, flow proceeds from S235 to S270. The job is executed at S270 to remove background pixels from the image. The image may be retrieved from the blob store using the URL of the message, and known image processing techniques may be applied to the image to remove the background at S270.

Figure 7:
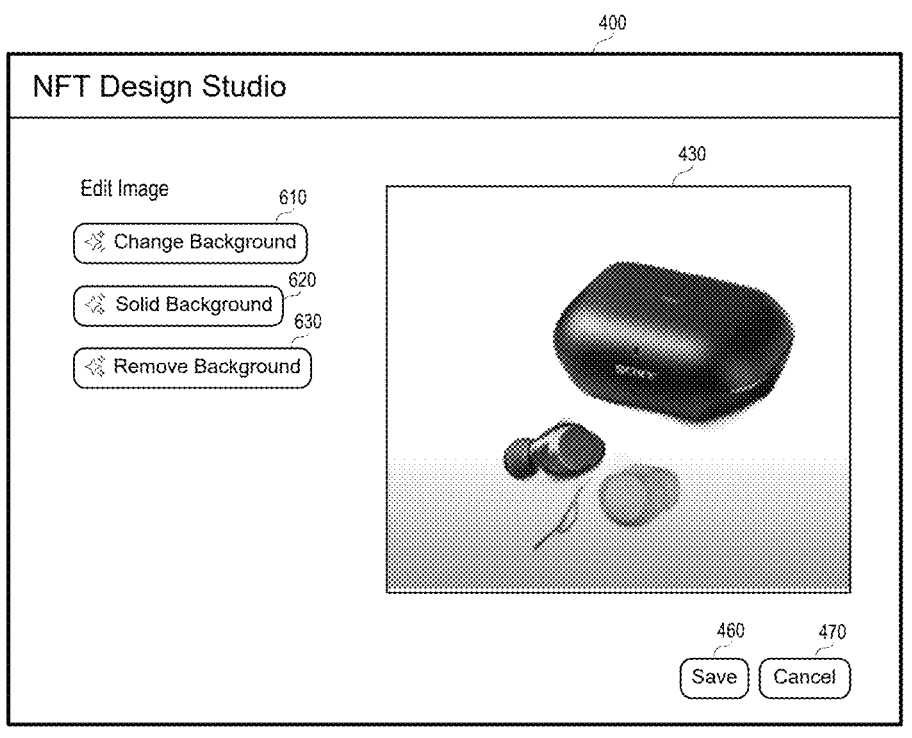
FIG. 7 is a user interface for creating an NFT according to some embodiments.

The resulting image is stored in the blob store at S250, and a corresponding URL is received from the blob store. The cache is updated at S255 to associate the identifier of this request with a new request status (e.g., "completed") and the URL. Since the job sequence does not include any further jobs, flow proceeds from S260 to S265 to return the blob store URL to the requestor. FIG. 7 shows user interface 400 displaying an example of a background-removed image retrieved from the blob store using the returned URL.

Figure 8:
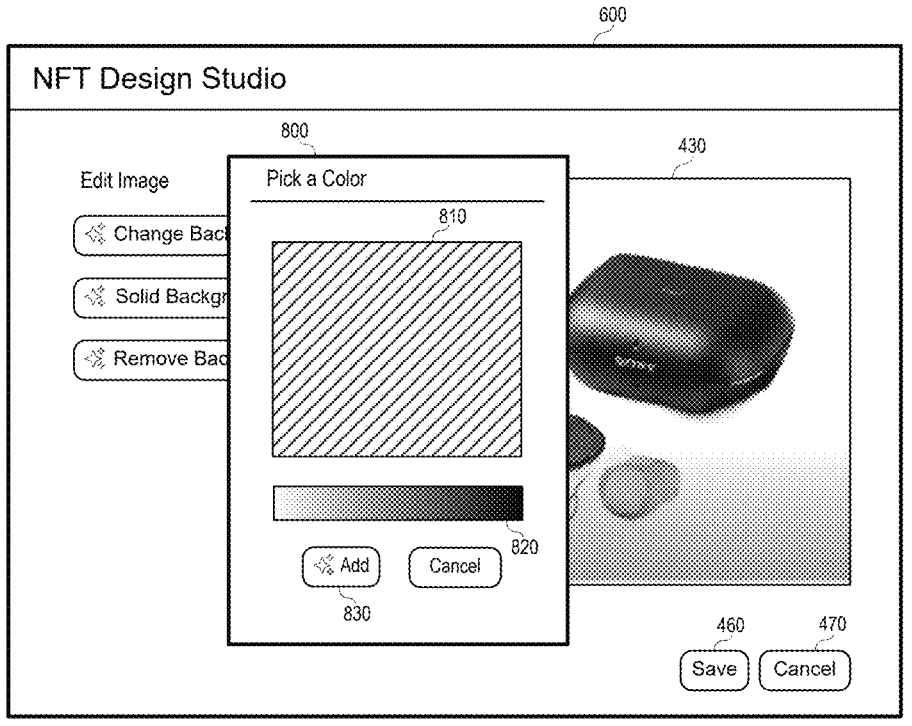
FIG. 8 is a user interface for creating an NFT according to some embodiments.

It will now be assumed that the administrator selects control 620 to initiate a request to add a solid background to the displayed image. In response, and according to some examples, window 800 of FIG. 8 is displayed. The administrator may interact with controls 810 and 820 to select a background color. Embodiments may employ any other suitable interface for selecting a color, pattern, image or other visual entity for use as an image background. Selection of Add control 830 causes receipt of a corresponding request at S205. The request may include parameters such as the URL of the background-removed image, data describing the selected background color, a consumer_id and a tenant_id as described above.

The workflow coordinator is queried at S210 and the determined job sequence consists of one job, an add_solid-_background job. An identifier of the received request is generated at S215 and is stored at S220 in association with the job sequence and other request metadata such as the URL, a status, and the processing queue of the next job to be processed (i.e., solid_background). A message including the parameters is generated at S225 and is stored in the processing queue associated with the upcoming job.

It will be assumed that solid background service 146 retrieves the message from queue 176 at S230. Solid background service does not require image generation so flow proceeds from S235 to S270. The job is executed at S270 to retrieve the image from the blob store using the URL of the message and to add the selected background to the image.

Figure 9:
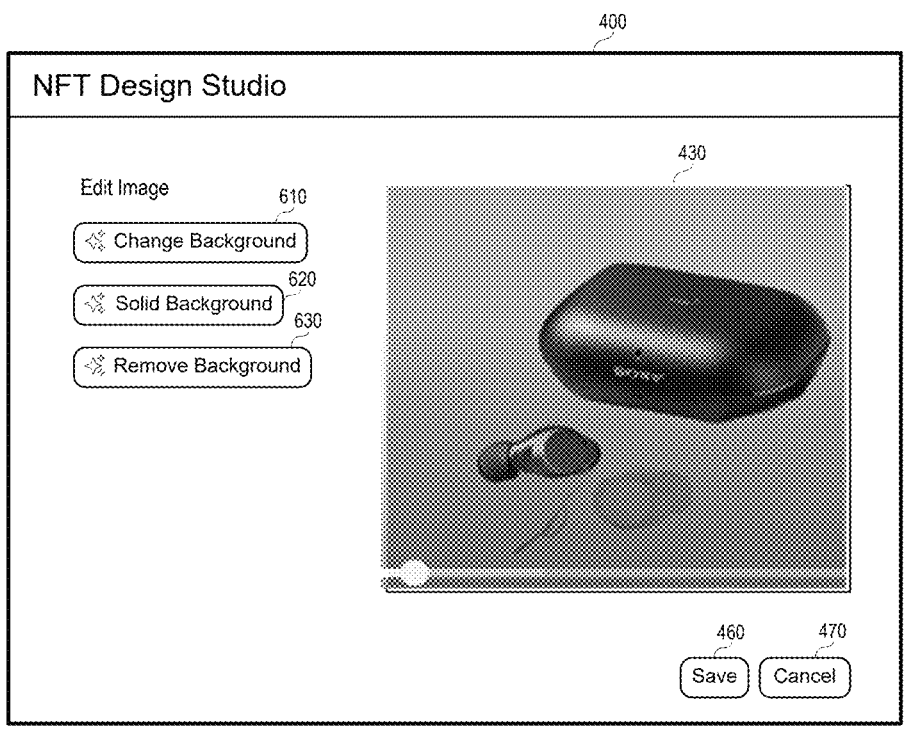
FIG. 9 is a user interface for creating an NFT according to some embodiments.

S250 includes storing the resulting image in the blob store and receiving a corresponding URL. The cache is updated at S255 to associate the request identifier with a new request status and the URL. Again, the job sequence does not include any further jobs, so flow proceeds from S260 to S265 to return the latest URL to the requestor. FIG. 9 shows user interface 400 displaying an example of an image retrieved from the blob store using the returned URL.

Figure 10:
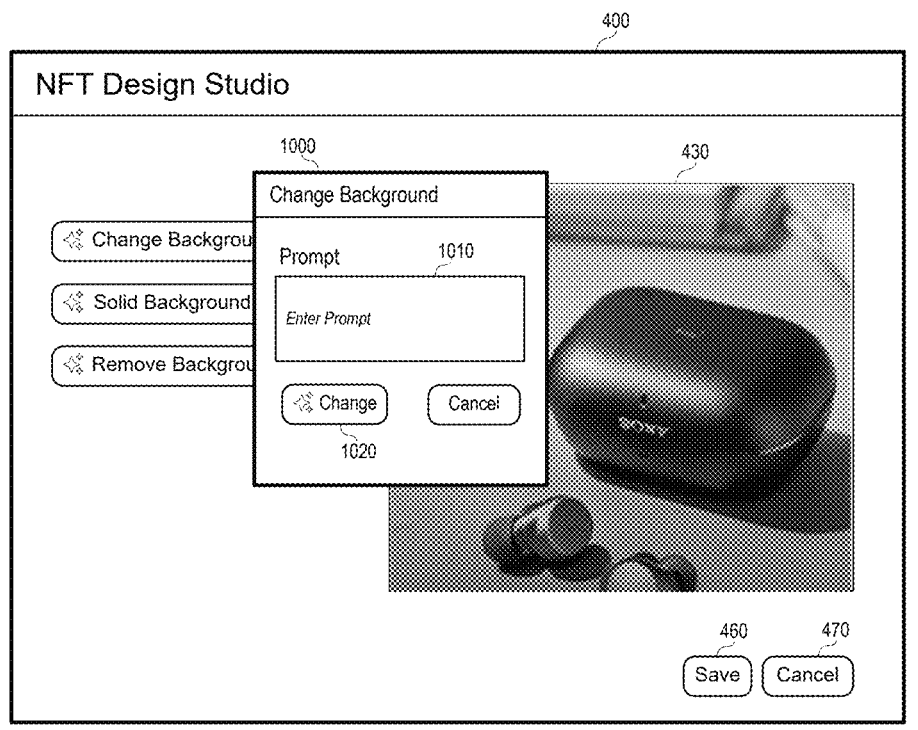
FIG. 10 is a user interface for creating an NFT according to some embodiments.

It is now assumed that the administrator selects Change Background control 610 while area 430 includes the image shown in FIG. 6. In response, and according to some examples, window 1000 of FIG. 10 is displayed. Window 1000 includes prompt area 1010 and Change control 1020. According to some embodiments, the administrator inputs a prompt in area 1010 describing a desired background. In the present example, it will be assumed that the prompt is "wooden table". The administrator then selects Add control 1020 to issue a request which is received at S205. The request may include parameters such as the URL of the presented image and the prompt.

At S210, workflow coordinator 130 checks workflow policies 135 for a workflow corresponding to the request to change the background. According to the present example, it is determined that the workflow includes three jobs, a remove_background job, an add_solid_background job and a change_background job. A unique identifier of the request is generated at S215 and the identifier is stored in association with the job sequence and other request metadata in a cache at S220.

Next, at S225, a message including the URL, the prompt and the job sequence is generated and is stored in the processing queue associated with the upcoming job, i.e., processing queue 174, which corresponds to background removal service 144. As described above, background removal service 144 retrieves the message from the queue at S230, retrieves the image from the blob store using the URL of the message and removes background pixels from the image at S270. Service 144 then stores the resulting image in the blob store at S250, and a corresponding URL is received from the blob store. The cache is updated at S255 to associate the request identifier with a new request status (e.g., "remove_background job-completed") and the corresponding URL.

Service 144 then determines, at S260 and based on the message retrieved from processing queue 174, that the message includes additional jobs. Therefore, at S275, the message is updated with the URL received from the blob store by service 144 and a status of a next job (e.g., add_solid_background job—in progress). Service 144 then stores the updated message in processing queue 176 associated with the next job. In this regard, FIG. 1 shows an arrow from service 144 to queue 176.

Next, at S230, service 146 retrieves the message from processing queue 176. Flow proceeds as described above with respect to service 146 to execute the job at S270 to retrieve an image from the blob store using the latest URL of the message and to add a solid background to the image. Service 146 stores the resulting image in the blob store and receives a corresponding URL at S250. The cache is updated at S255 to associate the request identifier with a new request status and the URL. Since the message includes another job, the message is updated at S275 with the URL received from the blob store by service 146 and a status of a next job (e.g., change_background job—in progress). Service 146 then stores the updated message in processing queue 178 associated with the next job (i.e., change_background job).

Change background service 148 retrieves the message from processing queue 178 at S230. Since change background service 148 requires image generation, an image generation model is prompted at S240 to generate an image based on the most-recent URL stored in the retrieved message and the prompt included in the message. The generated image is received at S245.

Figure 11:
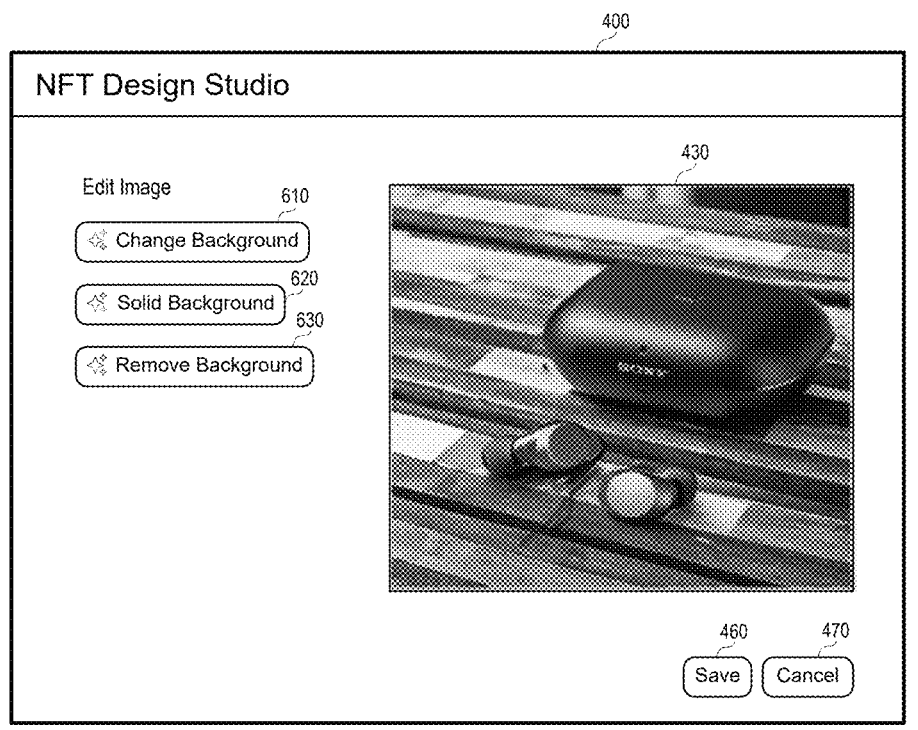
FIG. 11 is a user interface for creating an NFT according to some embodiments.

Service 148 then stores the generated image in the blob store and receives a corresponding URL at S250. The cache is updated at S255 to associate the request identifier with a new request status and the URL. Since the message does not include another job, flow proceeds to S265 to return the last URL to the requestor. FIG. 11 shows an image retrieved using the URL and displayed in area 430 according to the present example.

Throughout the execution of process 200, a requestor may use a returned request identifier to poll API server 120 for the current status of the request. In response, API server 120 queries the cache with the request identifier to retrieve the current status associated with the request identifier. The status may specify a currently-executing job and any completed jobs corresponding to the request.

Figure 12:
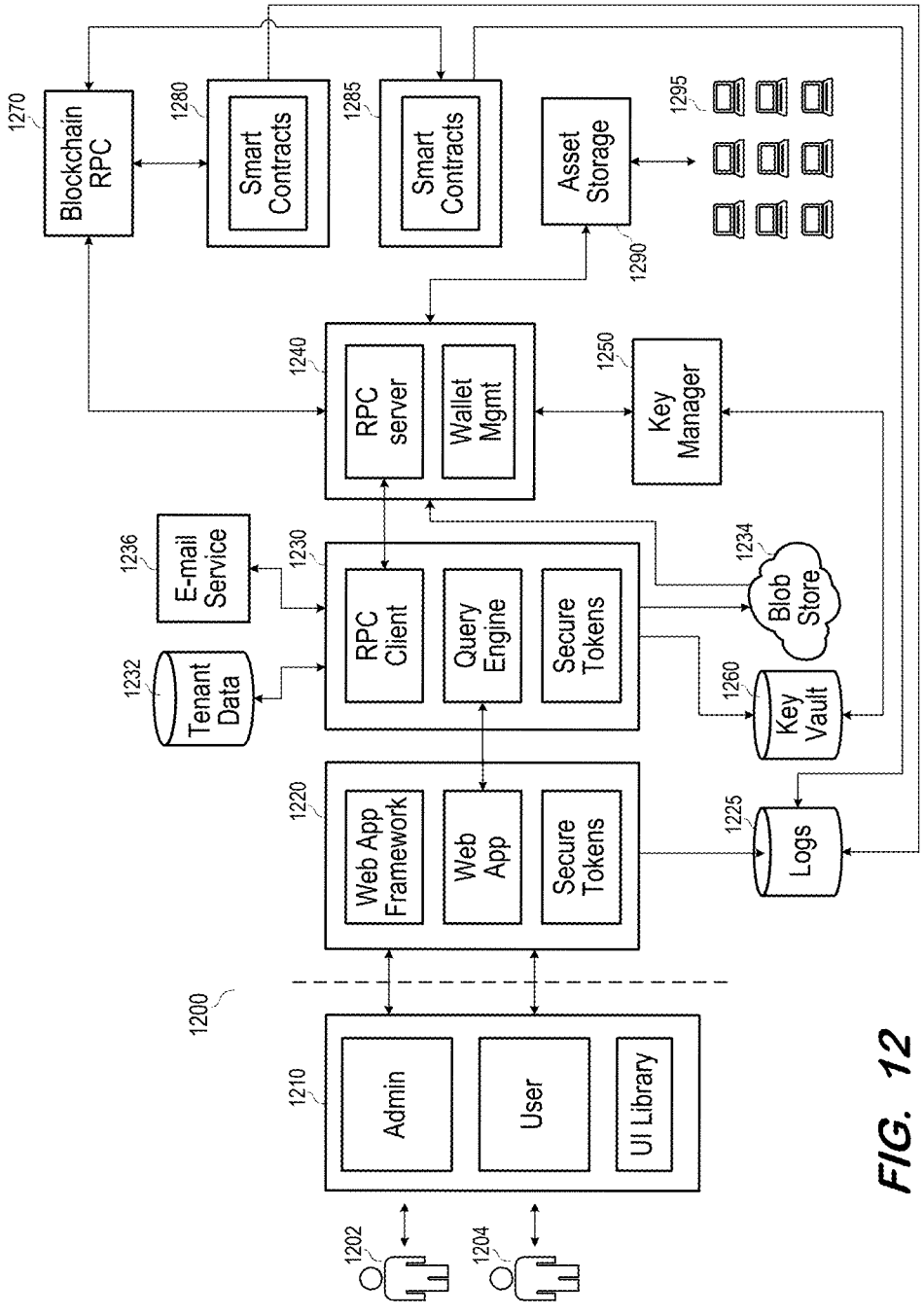
FIG. 12 is a block diagram of a system to manage NFTs using Web2 protocols according to some embodiments.

FIG. 12 is a block diagram of a system to manage NFTs using Web2 protocols according to some embodiments. Client 1210 may comprise an implementation of device 104, client server 1220 may comprise an implementation of server 110, API layer 1230 may comprise an implementation of API server 120, and blob store 1234 may comprise an implementation of blob store 160. Accordingly, system 1200 may operate to execute process 200 in some embodiments.

API layer 1230 supports a traditional Web2 architecture of client 1210, client server 1220 and tenant data 1232, while also passing through and synchronizing with Web3 data through Web3 interface server 1240. API layer 1230 may comprise a traditional Software-as-a-Service application providing user and account management, Web2 data models and data storage, and multitenancy support. API layer 1230 allows access through secure tokens (e.g., PASETO tokens, JSON Web Tokens), saves transactional data into tenant data 1232 and blob store 1234, sends outgoing e-mails via e-mail service 1236 (e.g., SendGrid) and executes an RPC (e.g., gRPC) client to communicate with Web3 interface server 1240. The secure tokens store information regarding the user, the tenant, and the user's role. All queries may be authenticated and authorized using the token information rather than API arguments.

Web3 interface server 1240 is a stateless service that handles interactions with blockchains 1280 and 1285. For example, Web3 interface server 1240 may transmit signed transactions to blockchains 1280 and 1285. The transactions may, for example, create a Web3 asset (e.g., an NFT), transfer a Web3 asset, create a smart contract, and interact with a smart contract. In the latter regard, Web3 interface server 1240 provides transactions needed to execute the functionality of the created smart contracts so that API layer 1230 can call that functionality via Web3 interface server 1240.

Web3 interface server 1240 may communicate with blockchains 1280 and 1285 via blockchain RPC 1270. Embodiments are not limited to two blockchains. According to Web3 architecture, each block on a blockchain is composed of transactions.

Blockchain RPC 1270 may be provided by a 3rd party (e.g., Alchemy) but embodiments are not limited thereto. Web3 interface server 1240 may comprise a Rust server which communicates with API layer 1230 through gRPC, where Protocol Buffers define the API contracts between Web3 interface server 1240 and API layer 1230.

Web3 interface server 1240 communicates with asset storage layer 1290 to store metadata and data of NFTs in decentralized storage 1295. Decentralized storage may comprise IPFS, and layer 1290 may comprise web3.storage in some embodiments.

Web3 interface server 1240 provides management of tenant (i.e., custodial tenant) and user wallets. The wallet management component of Web3 interface server 1240 includes wallet creation, funds transfer, and other functionalities. The wallet management component also includes orchestration of blockchain transaction signing using a private key associated with a wallet. Key manager 1250 may implement a remote signing utility which is called by Web3 interface server 1240 to request such signing. Key manager 1250 may in turn request signing of a transaction using a private key stored in key vault 1260. Key manager 1250 may comprise a trusted open-source key management solution such as Consensys Quorum Key Manager but embodiments are not limited thereto.

Before a transaction can be included in a block, it must be executed by a virtual machine associated with the blockchain, such as the Ethereum Virtual Machine (EVM). The EVM runs on top of the blockchain to execute transactions between users and smart contracts and compute the new state resulting from those interactions. The newly-computed state becomes the base for a new block.

Smart contracts are programs that contain logic written in specifically-purposed languages. The code and variables of a smart contract are deployed and stored on the blockchain. A smart contract deployed to the blockchain is uniquely identified and accessed by its address. An address can identify a smart contract or an externally-owned account. Externally-owned accounts are controlled by users and smart contracts are controlled by code, although both can hold balances and interact with smart contracts.

A clone factory contract (e.g., EIP-1167) for each smart contract to be used may be deployed on blockchains 1280 and 1285. A clone factory contract is called by Web3 interface server 1240 to clone new smart contracts on its blockchain. The clone factory contracts may leverage open-source libraries (e.g., OpenZeppelin) and may comprise Solidity smart contracts in the case of the Ethereum blockchain.

In some embodiments, client server 1220, API layer 1230 and Web3 interface server 1240 are deployed as Docker containers using Kubernetes. Client server 1220, API layer 1230 and Web3 interface server 1240, as well as key manager 1250, may be deployed in the same on-premise backend.

Administrator 1202 or user 1204 may operate client 1210 to provide authentication credentials (e.g., username and password) to client server 1220. Client server 1220 executes its Web application to perform an authentication process based on the credentials, receive requests from client 1210, and instructs API layer 1230 to read from and write to tenant data 1232 in response to the requests and based on data authorizations granted to administrator 1202 or user 1204. The Web application may provide any functionality that is or becomes known, including but not limited to enterprise resource planning functionalities.

According to some embodiments, client 1210 interacts with client server 1220 using interfaces presented on a Web client of a user device to initiate minting of an NFT. Administrator 1202 may create metadata describing the NFT and also specify the name and attributes of the NFT. Administrator 1202 may initiate processes described herein to generate and/or edit an image of an NFT and to store the resultant image in blob store 1234. Client server 1220 may instruct API layer 1230 to store the metadata and data of the NFT in association with an identifier of the NFT and a tenant identifier in tenant data 1232.

Administrator 1202 may use client 1210 to specify e-mail addresses of users to whom an NFT should be distributed. Accordingly, e-mail service 1236 may transmit e-mails distributing the NFT to the users and tenant data 1232 may also store a list of e-mail addresses to which the NFT was distributed. User 1204 may receive such an e-mail via their e-mail client application and access client server 1220 using a link provided in the e-mail. The user then interacts with client server 1220 using interfaces presented by client 1210 to claim the NFT. As a result, an identifier of the user is stored in tenant data 1232 in association with the identifier of the NFT to indicate that the user "owns" the NFT.

Blob store 1234 may be cloud-based and may provide storage at a lower cost than comparable file-based storage systems. API layer 1230 may store unstructured data such as NFT images in blob store 1234. Accordingly, if a user requests to view the data and metadata of an NFT which they own, API layer 1230 may retrieve the corresponding metadata and data from tenant data 1232 and the image from blob store 1234 for presentation to the user without accessing Web3 storage. Accesses to tenant data 1232 and blob store 1234 using Web2 protocols are typically much faster and reliable than accesses to Web3 storage due in part to the asynchronous nature of Web3 protocols.

API layer 1230 may request generation of a cryptographic keypair (e.g., a public key and a private key) from key vault 1260. Key vault 1260 generates the keypair, stores the keypair and returns an identifier of the keypair (e.g., a wallet identifier) to API layer 1230. In this regard, a wallet as described herein is a cryptographic keypair and a wallet identifier is an identifier of the keypair. A wallet identifier may comprise the public key of a keypair in some embodiments. API layer 1230 may store the wallet identifier in tenant data 1232.

The request to generate a keypair may be issued in response to a request received by client server 1220 to create a tenant. A tenant may represent a customer organization, and employees of the organization may be considered users of the tenant. Accordingly, client server 1220 may store the returned identifier of the keypair in association with an identifier of the tenant. In some embodiments, an application executed by client server 1220 may comprise a multi-tenant application, in which case API layer 1230 may request generation of a respective keypair for each of several tenants and store a returned identifier of each generated keypair in association with an identifier of its respective tenant in tenant data 1232.

Key vault 1260 may be provided by an entity different from another one or more entities operating the other components of system 1200. Advantageously, the other entities are unable to access the private keys of the keypairs generated by key vault 1260. Rather, key vault 1260 may only be requested to sign a transaction on behalf of a tenant using its private key and to provide the signed transaction in return.

For example, API layer 1230 generates an RPC call specifying a database operation (e.g., a transaction) and transmits the RPC call and a custodial tenant identifier identifying a cryptographic keypair to Web3 interface server 1240. Web3 interface server 1240 provides the transaction and the identifier to key manager 1250. Key manager 1250 then requests key vault 1260 to encrypt (i.e., sign) the transaction using the private key associated with the identifier.

Key vault 1260 encrypts the transaction with a private key associated with the identifier (e.g., using the secp256k1 elliptic curve scheme and the ECDSA signing algorithm), and returns the thusly-signed transaction to key manager 1250. Web3 interface server 1240 submits the signed transaction to blockchain RPC 1270 by executing a predetermined JSON RPC call which corresponds to the RPC call received from client server 1220. Key manager 1250 may transform the transaction prior to providing the transaction to key vault 1260 so that the resulting signed transaction received from key vault 1260 conforms to a format acceptable to blockchain 1280.

According to some embodiments, the signed transaction generated by Web3 interface server 1240 may comprise a transaction to create a collection on a blockchain, to create an NFT of a collection on the blockchain, to transfer an NFT from one digital wallet to another digital wallet, to add attribute values to an NFT, etc. For example, Web3 interface server 1240 receives metadata (describing, among other things, the attributes of the NFT) and data of an administrator-defined NFT from client server 1220 and generates and transmits a signed blockchain transaction to blockchain RPC 1270 to mint the NFT on blockchain RPC 1270. Moreover, Web3 interface server 1240 executes Web3 protocols to transmit the metadata and data to decentralized storage layer 1290. Web3 interface server 1240 may also operate per instructions from client server 1220 to generate and transmit signed blockchain transactions to blockchain RPC 1270 to transfer ownership of an NFT from a tenant wallet to a user wallet.

Figure 13:
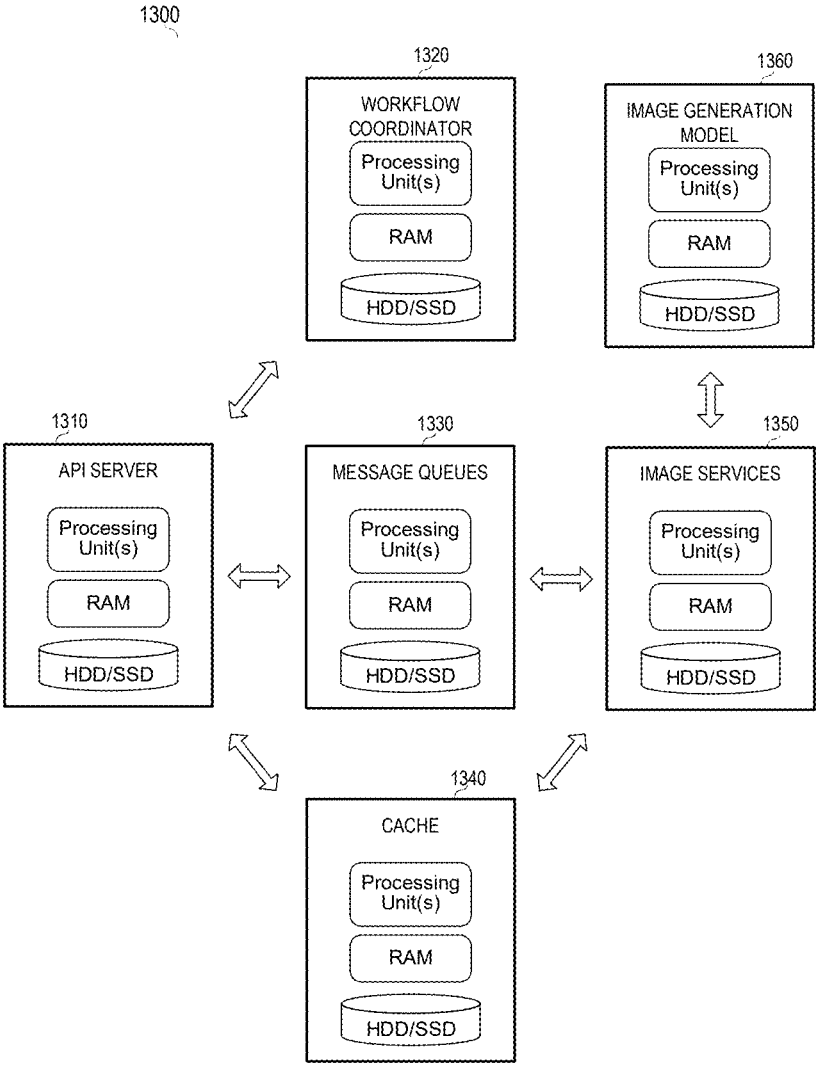
FIG. 13 is a block diagram of a system according to some embodiments.

FIG. 13 is a block diagram of cloud-based architecture 1300 according to some embodiments. Each of components 1310-1360 may comprise cloud-based compute resources, such as one or more virtual machines, allocated by a public cloud provider providing self-service and immediate provisioning, autoscaling, security, compliance and identity management features. Each of components 1310-1360 may execute containerized applications deployed in Docker containers on Kubernetes. A user may interact with an application via a Web2 paradigm to generate and edit images as described herein using the components of architecture 1300.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a first memory storing first executable program code;
    a first at least one processing unit to execute the first program code to cause the system to:
      receive a first request to generate an image for a Web3 asset, the first request comprising a first prompt;
      query a workflow coordinator for a first job sequence associated with the first request;
      store, in a cache, first metadata comprising an identifier of the request, the first job sequence and a first status of the first job of the first job sequence;

generate a first message comprising the identifier of the request, the first prompt and the first job sequence; and store the first message in a first processing queue associated with a first service to execute the first job;

a second memory storing second executable program code; and a second at least one processing unit to execute the second program code to cause the system to:

receive the first message from the first processing queue;

prompt an image generation model to generate a first image based on the prompt;

store the first image in a blob store, the stored first image associated with a Uniform Resource Locator;

store the Uniform Resource Locator in the cache in association with the identifier of the request;

update the first status stored in the cache to a second status; and return the Uniform Resource Locator, the first at least one processing unit to execute the first program code to cause the system to:

receive a second request to change a background of the first image, the second request comprising the Uniform Resource Locator;

query the workflow coordinator for a second job sequence associated with the second request, the second job sequence comprising a plurality of jobs;

generate a second message comprising the identifier of the second request, the Uniform Resource Locator and the second job sequence; and store the second message in a second processing queue associated with a second service to execute the first job of the second job sequence, and the system further comprising:

a third memory storing third executable program code; and a third at least one processing unit to execute the third program code to cause the system to:

receive the second message from the second processing queue;

retrieve the image from the blob store using the second Uniform Resource Locator;

remove a background from the retrieved image to generate a second image;

store the second image in the blob store, the stored second image associated with a second Uniform Resource Locator;

determine a second job of the second job sequence based on the second message;

add the second Uniform Resource Locator to the second message to generate a third message; and store the third message in a third processing queue associated with a third service to execute the second job of the second job sequence.

2. The system of claim 1, wherein the second request and the second message comprise a second prompt, the system further comprising:

a fourth memory storing fourth executable program code; and a fourth at least one processing unit to execute the fourth program code to cause the system to:

receive the third message from the third processing queue;

prompt the image generation model to generate a third image based on the second prompt and the second Uniform Resource Locator;

store the third image in the blob store, the stored third image associated with a third Uniform Resource Locator;

store the third Uniform Resource Locator in the cache in association with the identifier of the second request;

update the fifth status of the second job of the second job sequence stored in the cache to a sixth status indicating the second job is complete; and return the second Uniform Resource Locator.

3. The system of claim 2, the first at least one processing unit to execute the first program code to cause the system to:

return the identifier of the second request;

receive a polling request comprising the identifier of the second request;

in response to the polling request, query the cache for a status associated with the second request;

receive, in response to the query of the cache, the fifth status of the second job of the second job sequence indicating the second job is in-progress; and return the fifth status of the second job of the second job sequence indicating the second job is in-progress.

4. The system of claim 3, wherein the workflow coordinator determines the first job sequence and the second job sequence based on workflow policies which associate each of a plurality of request types with a respective job sequence comprising one or more jobs.

5. The system of claim 1, wherein the workflow coordinator determines the first job sequence based on workflow policies which associate each of a plurality of request types with a respective job sequence comprising one or more jobs.

6. A method comprising:

receiving a first request to generate an image for a Web3 asset from a requestor, the first request comprising a first prompt;

determining a first job sequence associated with the first request;

storing, in a cache, first metadata comprising an identifier of the request, the first job sequence and a first status of the first job of the first job sequence;

generating a first message comprising the identifier of the request, the first prompt and the first job sequence;

storing the first message in a first processing queue associated with a first service to execute the first job;

receiving, at the first service, the first message from the first processing queue;

prompting, by the first service, an image generation model to generate a first image based on the prompt;

storing, by the first service, the first image in a blob store, the stored first image associated with a Uniform Resource Locator;

storing, by the first service, the Uniform Resource Locator in the cache in association with the identifier of the request;

updating, by the first service, the first status stored in the cache to a second status;

returning the Uniform Resource Locator to the requestor, receiving a second request to change a background of the first image, the second request comprising the Uniform Resource Locator;

determining a second job sequence associated with the second request, the second job sequence comprising a plurality of jobs;

generating a second message comprising the identifier of the second request, the Uniform Resource Locator and the second job sequence;

storing the second message in a second processing queue associated with a second service to execute the first job of the second job sequence;

receiving, at the second service, the second message from the second processing queue;

retrieving, by the second service, the image from the blob store using the second Uniform Resource Locator;

removing, by the second service, a background from the retrieved image to generate a second image;

storing, by the second service, the second image in the blob store, the stored second image associated with a second Uniform Resource Locator;

determining, by the second service, a second job of the second job sequence based on the second message;

adding, by the second service, the second Uniform Resource Locator to the second message to generate a third message; and storing, by the second service, the third message in a third processing queue associated with a third service to execute the second job of the second job sequence.

7. The method of claim 6, further comprising:

receiving, at the third service, the third message from the third processing queue;

prompting, by the third service, the image generation model to generate a third image based on the second prompt and the second Uniform Resource Locator;

storing, by the third service, the third image in the blob store, the stored third image associated with a third Uniform Resource Locator;

storing, by the third service, the third Uniform Resource Locator in the cache in association with the identifier of the second request;

updating, by the third service, the fifth status of the second job of the second job sequence stored in the cache to a sixth status indicating the second job is complete; and returning, by the third service, the second Uniform Resource Locator.

8. The method of claim 7, further comprising:

returning the identifier of the second request;

receiving a polling request comprising the identifier of the second request;

in response to the polling request, querying the cache for a status associated with the second request;

receiving, in response to the query, the fifth status of the second job of the second job sequence indicating the second job is in-progress; and returning the fifth status of the second job of the second job sequence indicating the second job is in-progress.

9. The method of claim 8, wherein determining the first job sequence comprises querying a workflow coordinator with the first request; and wherein determining the second job sequence comprises querying the workflow coordinator with the second request.

10. The method of claim 6, wherein determining the first job sequence comprises querying a workflow coordinator with the first request.

11. One or more non-transitory media storing program code executable by at least one processing unit of a computing system to cause the computing system to:

receive a first request to generate an image for a Web3 asset from a requestor, the first request comprising a first prompt;

query a workflow coordinator to determine a first job sequence associated with the first request;

store, in a cache, first metadata comprising an identifier of the request, the first job sequence and a first status of the first job of the first job sequence;

generate a first message comprising the identifier of the request, the first prompt and the first job sequence;

store the first message in a first processing queue associated with a first service to execute the first job;

receive, at the first service, the first message from the first processing queue;

prompt, by the first service, an image generation model to generate a first image based on the prompt;

store, by the first service, the first image in a blob store, the stored first image associated with a Uniform Resource Locator;

store, by the first service, the Uniform Resource Locator in the cache in association with the identifier of the request;

update, by the first service, the first status stored in the cache to a second status;

return the Uniform Resource Locator to the requestor;

receiving a second request to change a background of the first image, the second request comprising the Uniform Resource Locator;

querying the workflow coordinator for a second job sequence associated with the second request, the second job sequence comprising a plurality of jobs;

generating a second message comprising the identifier of the second request, the Uniform Resource Locator and the second job sequence;

storing the second message in a second processing queue associated with a second service to execute the first job of the second job sequence;

receiving, at the second service, the second message from the second processing queue;

retrieving, by the second service, the image from the blob store using the second Uniform Resource Locator;

removing, by the second service, a background from the retrieved image to generate a second image;

storing, by the second service, the second image in the blob store, the stored second image associated with a second Uniform Resource Locator;

determining, by the second service, a second job of the second job sequence based on the second message;

adding, by the second service, the second Uniform Resource Locator to the second message to generate a third message; and storing, by the second service, the third message in a third processing queue associated with a third service to execute the second job of the second job sequence.

12. The one or more non-transitory media of claim 11, the program code further executable by at least one processing unit of the computing system to cause the computing system to:

receive, at the third service, the third message from the third processing queue;

prompt, by the third service, the image generation model to generate a third image based on the second prompt and the second Uniform Resource Locator;

store, by the third service, the third image in the blob store, the stored third image associated with a third Uniform Resource Locator;

store, by the third service, the third Uniform Resource Locator in the cache in association with the identifier of the second request;

update, by the third service, the fifth status of the second job of the second job sequence stored in the cache to a sixth status indicating the second job is complete; and return, by the third service, the second Uniform Resource Locator.

13. The one or more non-transitory media of claim 12, the program code further executable by at least one processing unit of the computing system to cause the computing system to:

return the identifier of the second request;

receive a polling request comprising the identifier of the second request;

in response to the polling request, query the cache for a status associated with the second request;

receive, in response to the query, the fifth status of the second job of the second job sequence indicating the second job is in-progress; and return the fifth status of the second job of the second job sequence indicating the second job is in-progress.

14. The one or more non-transitory media of claim 13, wherein the workflow coordinator determines the first job sequence and the second job sequence based on workflow policies which associate each of a plurality of request types with a respective job sequence comprising one or more jobs.

* * * * *